United States Patent
Handerek et al.

(10) Patent No.: US 10,774,269 B2
(45) Date of Patent: Sep. 15, 2020

(54) METHOD OF PREPARATION OF HYDROCARBON FUELS FROM POLYOLEFIN WASTE MATERIALS

(71) Applicant: HANDEREK TECHNOLOGIES SP. Z O.O, Warsaw (PL)

(72) Inventors: Adam Handerek, Bielsko-Biala (PL); Maciej Pawel Kowalczyk, Minsk-Mazowiecki (PL); Jan Kiraga, Minsk-Mazowiecki (PL); Krzysztof Biernat, Warsaw (PL); Anna Matuszewska, Serock (PL)

(73) Assignee: HANDEREK TECHNOLOGIES SP. Z O.O., Warsaw (PL)

( * ) Notice: Subject to any disclaimer, the term of this patent is extended or adjusted under 35 U.S.C. 154(b) by 0 days.

(21) Appl. No.: 16/610,106

(22) PCT Filed: Apr. 20, 2018

(86) PCT No.: PCT/PL2018/000040
§ 371 (c)(1),
(2) Date: Nov. 1, 2019

(87) PCT Pub. No.: WO2018/203763
PCT Pub. Date: Nov. 8, 2018

(65) Prior Publication Data
US 2020/0080004 A1 Mar. 12, 2020

(30) Foreign Application Priority Data
May 3, 2017 (PL) .......................................... 421467

(51) Int. Cl.
*C10G 3/00* (2006.01)
*C10G 1/00* (2006.01)
(Continued)

(52) U.S. Cl.
CPC ............. *C10G 1/008* (2013.01); *C10G 1/086* (2013.01); *C10G 3/52* (2013.01); *C10G 45/32* (2013.01);
(Continued)

(58) Field of Classification Search
CPC .......... C10G 1/008; C10G 1/086; C10G 1/10; C10G 2300/1003; C10G 2400/02;
(Continued)

(56) References Cited

U.S. PATENT DOCUMENTS 7,714,178 B2 * 5/2010 Bylicki .................... C10G 1/10
201/25
2017/0121608 A1 * 5/2017 Handerek ............... C10B 47/20

FOREIGN PATENT DOCUMENTS

EP 0448884 A1 12/1990
JP H0559372 A 3/1993
(Continued)

OTHER PUBLICATIONS

PCT International Search Report for PCT/PL2018/000040, dated Jul. 20, 2018.

*Primary Examiner* — Sharon Pregler
(74) *Attorney, Agent, or Firm* — McBee Moore & Vanik IP, LLC

(57) ABSTRACT

Method of producing hydrocarbon fuels from polyolefin waste materials, wherein: polyolefin waste materials are subjected to continuous depolymerisation in a tower flow reactor with a movable packing, which comprises a heating system for heating the lower half of the reaction chamber, where products of depolymerisation are collected in a gaseous state through an outlet in the upper half of the reaction chamber; and the obtained products of depolymerisation are subjected to catalytic hydrogenation and isomerization in an atmosphere of synthesis gas, under atmospheric pressure, to
(Continued)

obtain a mixture of hydrocarbon fuels; characterised in that: polyolefin waste materials are mixed with heated elements constituting the packing of the reactor until the surface of the packing elements is coated with a thin layer of plasticised material, wherein in the depolymerisation process that obtained mixture is fed as a stream into the reaction chamber from the top of the chamber, whereas a synthesis gas is fed in a counter current from the bottom, the gas comprising carbon monoxide (CO) and hydrogen ($H_2$) with the molar ratio CO:$H_2$ being from 0.25 to 1.5: from 0.5 to 3.

12 Claims, 2 Drawing Sheets

(51) Int. Cl.
  *C10G 1/08* (2006.01)
  *C10G 45/32* (2006.01)
  *C10G 45/58* (2006.01)
  *C10G 65/12* (2006.01)
(52) U.S. Cl.
  CPC .............. *C10G 45/58* (2013.01); *C10G 65/12* (2013.01); *C10G 2300/1003* (2013.01); *C10G 2400/02* (2013.01); *C10G 2400/04* (2013.01); *C10G 2400/06* (2013.01); *C10G 2400/26* (2013.01)

(58) Field of Classification Search
  CPC ............ C10G 2400/04; C10G 2400/06; C10G 2400/20; C10G 2400/26; C10G 3/52; C10G 45/32; C10G 45/58; C10G 65/12; B01J 19/0013; B01J 4/002; B01J 4/008; B01J 8/24; B01J 8/26; B01J 19/0093; B01J 19/24; B01J 19/2415; B01J 19/2435; B01J 6/008; B01J 8/06; C07C 13/42; C07C 5/2556; C07C 5/2512; C07C 11/08; C07C 13/43; C07C 45/50; C07C 5/2506; C07C 5/255; C07C 5/2562; C07C 7/04; C07C 7/1485; C07C 47/02; C07C 11/09
  See application file for complete search history.

(56) References Cited

FOREIGN PATENT DOCUMENTS

| | | |
|---|---:|---|
| JP | 2009242485 A | 10/2009 |
| PL | 150773 B2 | 6/1990 |
| PL | 208516 B1 | 5/2011 |
| PL | 210518 B1 | 1/2012 |
| PL | 214388 B1 | 7/2013 |
| WO | 2004037906 A1 | 5/2004 |

* cited by examiner

METHOD OF PREPARATION OF HYDROCARBON FUELS FROM POLYOLEFIN WASTE MATERIALS

CROSS-REFERENCE TO RELATED APPLICATIONS

This application is the National Stage entry of International Application No. PCT/PL2018/000040, filed 20 Apr. 2018, which claims priority to Poland No. P.421467, filed 3 May 2017.

BACKGROUND

Field

This invention relates to a method for producing hydrocarbon fuels with a reduced content of unsaturated compounds from polyolefin waste materials by way of feedstock recycling.

Description of Related Art

Waste plastics mainly comprise thermoplastic materials, while more than 10% of communal waste are polyolefins, including: polyethylene (PE), polypropylene (PP) and polystyrene (PS), which results from their being utilised on a mass scale in the production of packaging, the main source of polymer waste.

Known methods of treatment of polyolefin waste materials include, among others, feedstock recycling, material recycling and energy recycling.

Energy recycling is based on the combustion waste plastics and collecting the energy produced in the process. However, even though polyolefins have a high calorific value, combustion of plastics releases environmentally hazardous substances, such as chlorine, sulphur or nitrogen compounds.

In turn, it is not possible to employ material recycling, which consists in plastics regranulation and reprocessing, in the case of some waste materials such as composite or metallised materials due to a high cost or lack of possibility of purification of waste.

That is why feedstock recycling, which consists in depolymerisation of polymer chains to produce lower molecular weight hydrocarbons that can be utilised in various processes, for example as fuel ingredients or as substrates in a variety of industrial processes, plays such an important role in the disposal of waste thermoplastics, including polyolefins.

Nevertheless, methods of depolymerisation of waste plastics involve implementation difficulties. For example, physicochemical properties of plastics cause a number of technical problems that obstruct the depolymerisation process. Availability of plastics in the form of solids requires liquification of the plastics at the initial stage of the process. However, low thermal conductivity factor of most plastics, their high heat capacity and high activation energy of the depolymerisation reaction render it difficult to evenly heat the entire volume of waste. For these reasons, during the heating the mass of plastics locally overheats, which leads to the production of large amounts of coke, a by-product of the depolymerisation reaction. Moreover, high viscosity of the liquified plastics, even at relatively high temperatures, obstructs the mixing processes, which additionally renders it impossible to generate an even temperature of the plastics during the depolymerisation. Exceeding the temperature of 450° C. in the case of most thermoplastics leads to the coking of heating surfaces of the reaction chamber, which also obstructs the flow of heat to the material, thereby necessitating temperature increase of the heat source. Decoking of the reaction space requires the process to be stopped and then resumed, which negatively influences the general efficiency and increases the cost of the process.

Therefore, depolymerisation of waste plastics is usually carried out with help of catalysts, which lower the activation energy of the depolymerisation reaction and ensure control over the molecular weight of the products. Lowering the temperature of depolymerisation as a result of catalyst activity decreases the amount of coke in the products, thereby improving the temperature efficiency of the process.

There are known depolymerisation processes carried out in an inert gas atmosphere, including nitrogen or some noble gases such as argon or helium.

In patent literature there are described various methods of thermal depolymerisation of waste plastics.

The description of the Polish patent application P.408583 discloses a method of thermal decomposition of waste plastics and biomass, wherein waste plastics and biomass are subjected to catalytic depolymerisation in the presence of zeolitic catalysts, in higher temperature conditions, between 450 to 550° C. Depolymerisation is carried out in a tower flow reactor—packed with Pall rings, in a continuous way, in a process in which the packing and the reactants in the form of ground plastic material mixed with a catalyst are fed into the reactor, and the whole is heated in the reactor for a predefined period of time. Having been subjected to the high temperature the plastics in the reaction chamber first undergo plasticisation and then thermal decomposition to lower molecular weight compounds. Gaseous products are removed through a top outlet of the reaction chamber while char residing on Pall rings is removed through a bottom outlet of the reaction chamber. The gaseous products constituting a mixture of hydrocarbons can then be separated by way of distillation into fractions: benzine fraction with a boiling point up to 180° C., and oil fraction with a boiling point of up to 360° C. The advantage of this process is a relatively high yield of the depolymerisation process while its disadvantages include uneven distribution of the plasticised plastic on the Pall rings and a high content of unsaturated bonds in the depolymerisation product.

Another important problem connected with depolymerisation of waste plastics is a high proportion of unsaturated compounds in the depolymerisation products, which limits their usefulness as ingredients of liquid hydrocarbon fuels. These problems are limited by way of subjecting the depolymerisation products to catalytic hydrogenation.

For example, Polish patent description PL210518 discloses a two-step method for hydrogenation of the hydrocarbon fraction from the polymer waste processing, wherein, in the first step, methanol is reduced to carbon monoxide and hydrogen in an inert gas atmosphere, at a temperature between 100 to 300° C. in the presence of a catalyst: a metal oxide selected from the group of: CoO, NiO, CuO and ZnO, deposited on a carrier selected from the group of: $SiO_2$, $Al_2O_3$, $TiO_2$ and $ZrO_2$. Next, in the second step, unsaturated fractions being the products of polyolefin decomposition and having a boiling point below 360° C. are subjected to hydrogenation with help of the mixture of carbon monoxide and hydrogen, at a temperature between 100 to 400° C. in the presence of a metal catalyst selected from the group of: Pt, Rh, Co/Mo, Mo, W and Fe, on an oxide carrier selected from the group of: $SiO_2$, $Al_2O_3$, $TiO_2$, MgO and $ZrO_2$. Products obtained in this process can be used as components of liquid fuels.

It follows from the publications discussed above that the technology of polyolefins feedstock recycling is being constantly modified in order to improve the quality of fuels obtained through depolymerisation, in particular by means of limiting the content of unsaturated compounds, which presence in fuel, especially benzine or oil fraction, can lead to accelerated aging of the fuel and to precipitation of deposits.

It would be advisable to further improve on the process of manufacturing hydrocarbon fuels from polyolefin waste materials such as PE, PP or PS, in a process that comprises thermal depolymerisation of such materials.

SUMMARY

The subject-matter of the invention is a method of producing hydrocarbon fuels from polyolefin waste materials, wherein: polyolefin waste materials are subjected to continuous depolymerisation in a tower flow reactor with a movable packing, which comprises a heating system for heating the lower half of the reaction chamber, where products of depolymerisation are collected in a gaseous state through an outlet in the upper half of the reaction chamber; and the collected products of depolymerisation are subjected to catalytic hydrogenation and isomerisation in an atmosphere of synthesis gas, under atmospheric pressure, to obtain a mixture of hydrocarbon fuels. The method is characterised in that polyolefin waste materials are mixed with heated elements constituting the packing of the tower reactor until the surface of the packing elements is coated with a thin layer of plasticised material, wherein in the depolymerisation process the obtained mixture is fed as a stream into the reaction chamber from the top of the chamber, whereas a synthesis gas is fed in a counter-current from the bottom, the gas comprising carbon monoxide (CO) and hydrogen ($H_2$), the molar ratio $CO:H_2$ being from 0.25 to 1.5: from 0.5 to 3.

DETAILED DESCRIPTION OF A PREFERRED EMBODIMENT

Preferably, depolymerisation is carried out under atmospheric pressure.

Preferably, the packing of the reaction chamber is selected from the group of Raschig rings, Pall rings, Białecki rings.

Preferably, the polyolefin waste materials are mixed with the reactor packing at an amount not greater than 1 kg of the material per 1 $m^2$ of the specific surface area of the packing.

Preferably, the mixture of the reactor packing and the plasticised material is fed into the reaction chamber at a temperature of 240 to 260° C., preferably 250° C.

Preferably, depolymerisation is carried out maintaining a temperature gradient, wherein the lower half of the tower reactor's chamber is heated using a heating system to a temperature in the range of 400 to 440° C., while near the outlet for depolymerisation products the temperature is maintained in the range of 200 to 360° C.

Preferably, depolymerisation is used for polyolefin materials selected from the group of polyethylene, polypropylene and polystyrene.

Preferably, depolymerisation products are delivered to the process of hydrogenation and isomerisation in a gaseous state having a temperature in the range of 320 to 360° C.

Preferably, hydrogenation is carried out inthe presence of at least one metallic catalyst selected from the group of platinum and palladium deposited on an oxide carrier selected from the group of $Al_2O_3$ and $P_2O_5$.

Preferably, hydrogenation and isomerisation are carried out in an atmosphere of synthesis gas comprising carbon monoxide and hydrogen, the weight ratio $CO:H_2$ being from 0.25 to 1.5: from 0.5 to 3.

Preferably, hydrogenation and isomerisation products are subjected to fractional distillation with separation into a low-boiling fraction (C1-C4), a benzine fraction and an oil fraction.

Preferably, the low-boiling fraction is used to produce synthesis gas for depolymerisation and hydrogenation.

Figure 1:
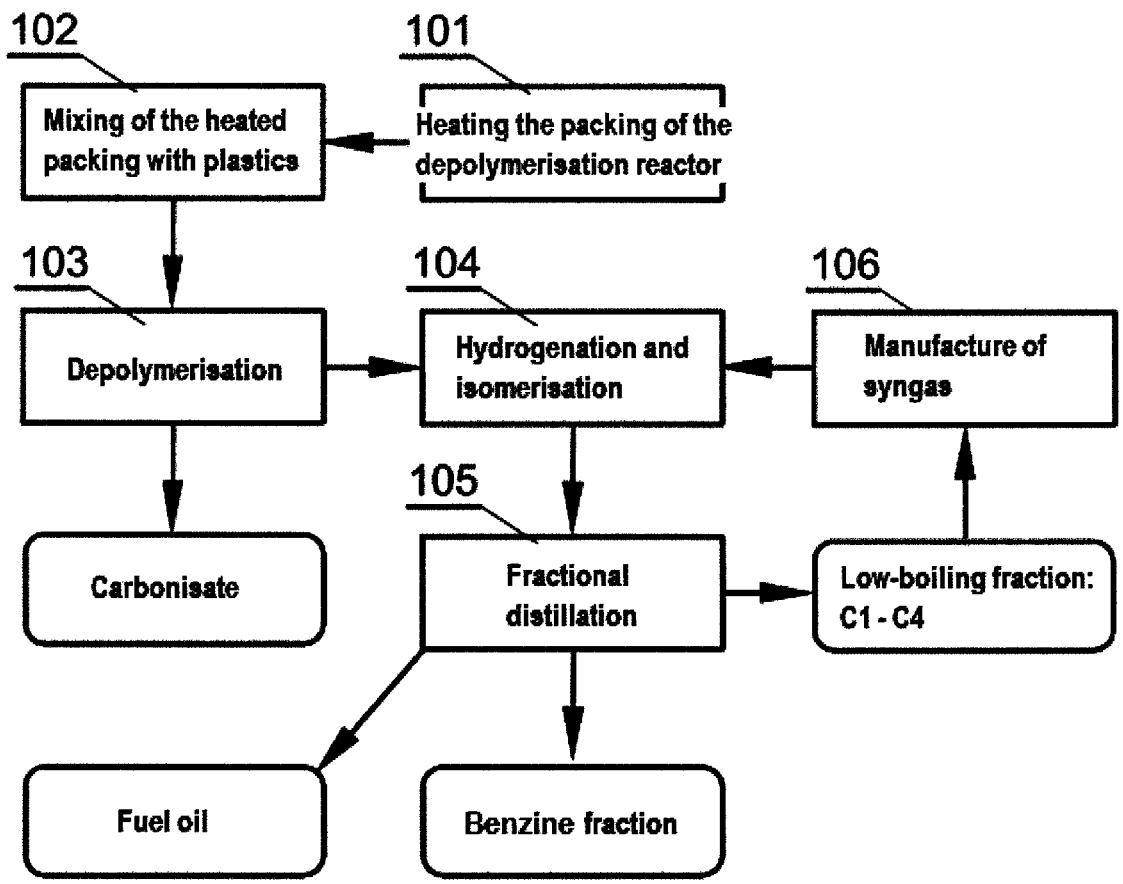
FIGS. 1-2 depict embodiments as described herein.
Figure 2:
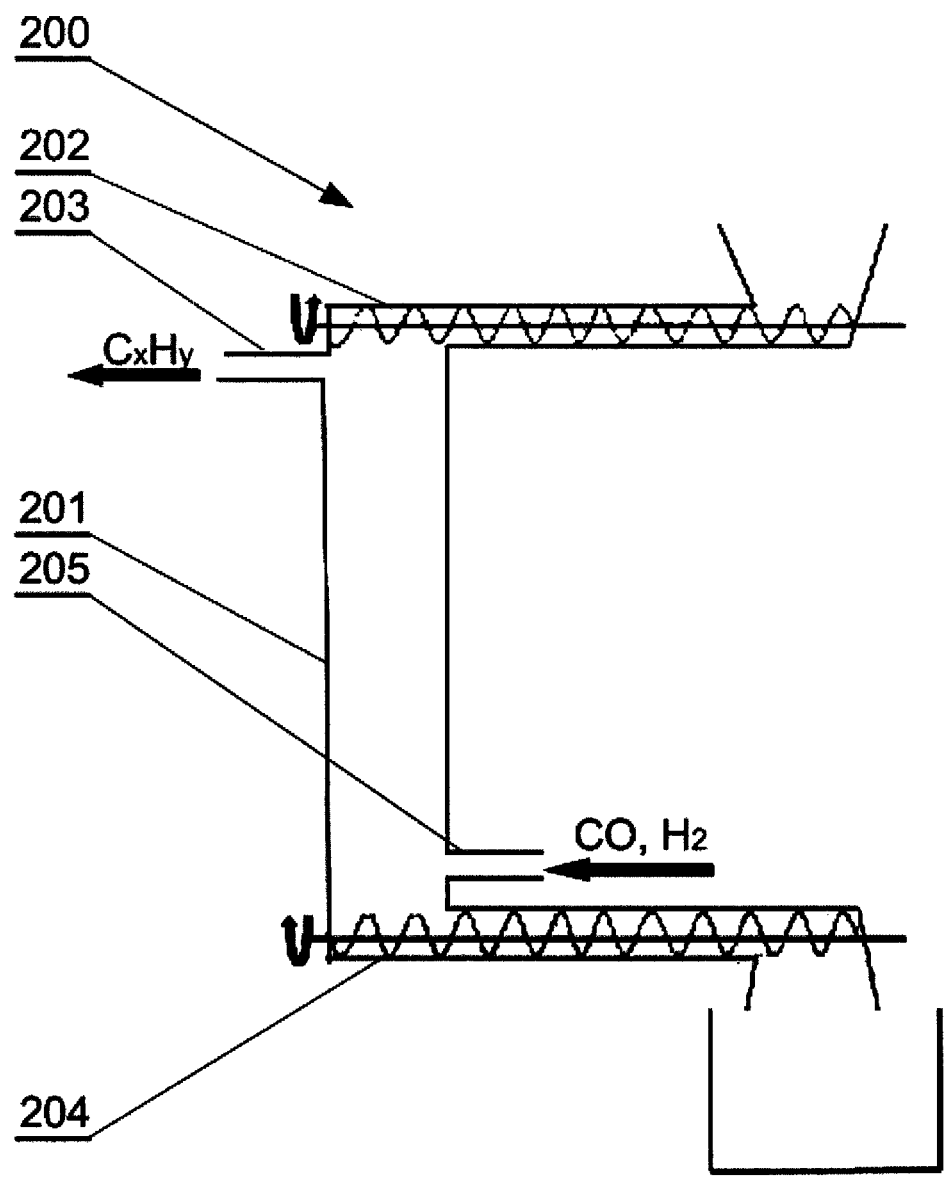

The subject-matter of the invention has been presented in an example embodiment in a drawing, in which:

FIG. 1 presents a block diagram of the process of manufacturing liquid fuels from waste plastics, FIG. 2 presents a schematic view of the reactor for depolymerisation of waste plastics in a cross-section.

As it is presented in FIG. 1, the method of manufacturing liquid fuels from waste plastics according to the invention involves: heating the packing of the depolymerisation reactor in step 101, mixing the waste plastics with the packing in step 102, feeding the obtained mixture into the reactor and depolymerising the waste plastics in step 103, hydrogenating and isomerising the depolymerisation products in step 104, and fractional distillation of the hydrocarbon mixture in step 105.

Preferably, before the launch of the process, waste polyolefins: polyethylene (PE), polypropylene (PP) and polystyrene (PS) are cleansed and ground, and then rinsed with nitrogen, in order to limit the amount of oxygen fed into the reactor with the air trapped in the spaces between fragments of the ground waste. Irrespective of the preparation of the raw material (waste polyolefins) the packing of the reactor is prepared, which is then heated in step 101 to a temperature between 430 and 470° C., preferably 450° C. The reactor can be packed with any known elements that are used as structured packing for distillation columns, for example Raschig rings, Pall rings, Białecki rings.

Heated elements of the packing are then mixed in step 102 with the cleansed and ground polyolefin waste for a time period necessary for plasticisation and formation on the surface of the packing elements of a uniform thin layer of the plastic, with thickness preferably from 0.3 to 2 mm. In order to obtain a suitable thinness of the plastic layer, the weight of the plastic per each 1 $m^2$ of the specific surface area of the packing elements may not be greater than 1 kg, preferably not more than 0.5 kg.

In order to obtain a suitably thin layer of the plastic on the surface of the packing elements, the plastic can be gradually fed into the chamber filled with the packing elements heated to an appropriate temperature, in such proportions as to maintain constant plasticity of the raw material on the surface of the packing elements.

Once the raw material is thoroughly mixed with the packing, the average temperature of the mixture should be within the range of 240 to 260° C., preferably 250° C., which is a result of heat transfer from the packing elements to the plastic.

Next, the packing covered with a uniform layer of the plastic having a temperature of about 250° C., namely, more than polyolefins' flow temperature, is fed into a chamber of depolymerisation reactor 200, which cross-section is presented schematically in FIG. 2. The reactor 200 can have a construction and dimensions similar to the depolymerisation reactor described in the Polish patent application P.408583. The depolymerisation reactor 200 is a tower reactor and it comprises a reaction chamber in the form of a vertical pipe 201, with an inlet 202 for the raw material and packing and an outlet 203 for gaseous products of depolymerisation located in an upper portion of the chamber, and an outlet 204 for the packing located in a lower portion of the chamber. Preferably, the raw material and packing inlet 202 and the packing outlet 204 are equipped with coreless screw conveyors, which provides for regulating the flow of the packing through the reaction chamber and by the same for controlling the time of stay of the reagents inside the chamber. The reaction chamber 201 preferably has a diameter smaller than its height, and preferably has the proportion of diameter to height of 1:6, which provides for an optimal distribution of temperature during the depolymerisation process.

The depolymerisation reactor 200 presented in FIG. 2, unlike the reactor according to the Polish patent application P.408583, is moreover equipped with an inlet 205, located near the packing outlet 204, for feeding a synthesis gas into the reaction chamber in a counter-current in relation to the direction in which the packing elements move during the depolymerisation process.

The depolymerisation reactor 200 is moreover equipped with a heating system (not presented in the drawing for the sake of intelligibility) in the form of a heating jacket located in a lower portion of the reaction chamber 201 and extending to the mid height of the chamber 201. Preferably, the heating system of the reactor is supplied with a liquid metal alloy, preferably a tin alloy, which constitutes a heating agent, which additionally provides for a uniform distribution of temperature in selected areas of the reaction chamber and allows obtaining a suitable temperature gradient inside the chamber. In the depolymerisation process the temperature measured in the lower half of the reaction chamber should be from 400 to 470° C., preferably 420° C., whereas in the upper (not heated) half of the reaction chamber 201 the temperature gradually falls so that in the topmost point of the chamber 201, namely near the depolymerisation products outlet 204, the temperature measured inside the chamber should be from 200 to 360° C. Temperature gradient inside the reaction chamber between the lowest and the topmost point of the chamber can be as much as 270° C. Such temperature gradient inside the reaction chamber is obtained for the reactor's heating system's temperature not exceeding 500° C.

In the depolymerisation process, in step 103, raw material is fed into the reaction chamber together with the packing elements, in a plasticised state—creating a thin, even layer of the plastic on the surface of the packing elements, at a temperature preferably about 250° C. In the reaction chamber the raw material is transported gravitationally towards the lower outlet 204 and undergoes further heating and depolymerisation in the atmosphere of a synthesis gas fed into the reaction chamber 202 in a counter-current through the inlet 205. In the depolymerisation process, a synthesis gas is used, containing hydrogen, carbon monoxide and possibly an addition of nitrogen constituting an inert for the purpose of diluting the components of the synthesis gas. The molar ratio of the components of the used synthesis gas $CO:H_2:N_2$ is from 0.25 to 1.5: from 0.5 to 3: from 0 to 1. The most preferred molar ratio $CO:H_2$ in the synthesis gas is 1:2.

The synthesis gas is fed into the reaction chamber as a stream in an amount of 50 to 500 litres of synthesis gas per 1 kg of raw material.

In the depolymerisation process, as a result of operation of high temperature, in an inert gas atmosphere, long polymer chains break apart and in a gaseous state are transported towards the outlet 203. The used synthesis gas functions therefore as a hydrogen donor and as a carrier facilitating the transport of the hydrocarbons in a gaseous state towards the upper portion of the reactor 200. Additionally it turns out that the presence of carbon monoxide in the synthesis gas improves the productivity of the depolymerisation process.

In the upper parts of the reactor, due to the temperature gradient inside the reaction chamber, hydrocarbons with boiling point above 360° C. get condensed on the reactor packing elements covered with a thin layer of the plastic, by the same supplying the stream of raw material newly fed into the reaction chamber 201, which results in lowering the depolymerisation reaction's activation temperature. The condensed hydrocarbons together with the packing are transported gravitationally towards the lower parts of the reactor, where, as a result of operation of a higher temperature, these hydrocarbons undergo further depolymerisation. The processes of depolymerisation in the lower parts of the reactor 200, where the temperature inside the reaction chamber reaches about 420° C., and of further condensation with the condensate supplying the stream of "fresh" raw material, can be repeated in the reactor 200 cyclically, until the obtainment of depolymerisation products with a boiling point below 360° C., preferably with a boiling point between 200 and 360° C. Depolymerisation products having a specific boiling point exit the reaction chamber 201 through the outlet 203.

During the process, as a by-product, char is deposited on the packing elements, and due to the conditions of the process it is in ash form, which can be mechanically separated from the packing elements, thanks to which the packing can be utilised many times in the depolymerisation process. The process of decharring the packing can be carried out, for example, by way of sifting the char on sieves. The process carried out in such way ensures therefore a reduction of downtimes, due to the possibility of removing the char from the packing elements outside of the reaction chamber 201.

The produced depolymerisation products in a gaseous state are subjected to hydrogenation and isomerisation in step 104. The processes of hydrogenation and isomerisation can be carried out in an analogous way to the description of the patent PL210518: with use of a metallic catalyst such as platinum and/or palladium deposited on an oxide carrier, for example $Al_2O_3$ or $P_2O_5$, at a temperature in the range of 320 to 360° C., in the presence of a synthesis gas which comprises CO and $H_2$ with the molar ratio $CO:H_2$ being from 0.25 to 1.5: from 0.5 to 3, and preferably with the molar ratio $CO:H_2$ being 1:2. However, unlike in the hydrogenation process described in the patent PL210518, the synthesis gas utilised in the present process is not made from methanol but from C1-C4 hydrocarbons that are preferably obtained in the process of depolymerisation of the polyolefins. Moreover, unlike in the solution known from the description of patent PL210518, according to the present invention the processes of hydrogenation and isomerisation are used hydrocarbons in a gaseous state at a temperature between 320 to 360° C. A pipe for transporting depolymerisation products to the hydrogenation and isomerisation reactor is equipped with a heating system and a temperature control system, which ensures an appropriate temperature of the depolymerisate at the hydrogenation and isomerisation reactor's inlet.

As a result of hydrogenation and isomerisation a mixture of saturated hydrocarbons is obtained, which is then subjected, in step 105, to fractional distillation to obtain a low-boiling fraction (C1-C4), a benzine fraction and an oil fraction. The distillation process can be carried out, for example, with use of a conventional distillation column.

The obtained C1-C4 fraction can be used for manufacturing synthesis gas 106 (FIG. 2), which is used for polyolefins depolymerisation and for subsequent hydrogenation and isomerisation processes, as well as for fuelling the hydrogenation and isomerisation reactor's burners or the power generator, for example in the form of a steam turbine.

The employed isomerisation process ensures the obtainment of branched products, which results in an increased octane rating of the produced hydrocarbon fuels.

In the process according to the present invention both the polyolefins depolymerisation and the hydrogenation and isomerisation processes are carried out under atmospheric pressure, which results in lowering installation and processing costs. For this reason the process is economically profitable regardless of whether a large or a small volume of waste plastics is processed annually, in contrast to pressure technologies, which require considerably large volumes of raw materials to be processed annually in order to render the process economically profitable.

Carrying out depolymerisation and hydrogenation under atmospheric pressure was made possible thanks to the developed depolymerisation technology, in which a hydrogen donor is a mixture of carbon monoxide and hydrogen (synthesis gas) at an appropriate ratio, with the volume of the stream of synthesis gas fed into the reaction chamber maintained at 50 to 500 litres of synthesis gas per 1 kg of raw material.

It turned out that the presence of carbon monoxide in the process improves the efficiency of both depolymerisation and hydrogenation. The depolymerisation process carried out in the atmosphere of synthesis gas is carried out under atmospheric pressure, without the addition of catalysts which, due to the necessity of regeneration, could increase production costs and generate environmentally hazardous waste.

Moreover, employing a solution that involves pre-mixing of the ground material with the heated packing allows the formation of a thin uniform film of plasticised polymer on the surface of the packing elements, due to which the material is heated more uniformly, which limits the occurrence of local overheating of the raw material during depolymerisation and results in a lower activation temperature of the reaction of breaking the carbon-carbon bonds in the polyolefin chains.

The present process also enables the production of saturated hydrocarbon products, including a low-boiling fraction C1-C4, a benzine fraction and an oil fraction, characterised by high purity—decreased amount of double bonds in the products, which is particularly difficult to obtain in the case of waste materials due to the presence of impurities in such materials as well as all sorts of additives.

Satisfactory limitation of unsaturated compounds in the produced hydrocarbon fractions is particularly important when depolymerisation products are used as fuels, which is caused by a relatively high reactivity of the double and triple bonds, which as a result of polymerisation or oxidation cause accelerated aging of the fuels and the precipitation of solid impurities.

The invention claimed is:

1. A method of producing hydrocarbon fuels from polyolefin waste materials, wherein:
   polyolefin waste materials are subjected to continuous depolymerisation in a tower flow reactor with a movable packing, which comprises a heating system for heating the lower half of the reaction chamber, where products of depolymerisation are collected in a gaseous state through an outlet in the upper half of the reaction chamber;
   and the obtained products of depolymerisation are subjected to catalytic hydrogenation and isomerisation in an atmosphere of synthesis gas, under atmospheric pressure, resulting in a mixture of hydrocarbon fuels;
   wherein:
   polyolefin waste materials are mixed with heated elements constituting the packing of the reactor until the surface of the packing elements is coated with a thin layer of plasticised material, wherein in the depolymerisation process the obtained mixture is fed as a stream into the reaction chamber from the top of the chamber, whereas a synthesis gas is fed in a counter-current from the bottom, the gas comprising carbon monoxide (CO) and hydrogen ($H_2$), with the molar ratio $CO:H_2$ being from 0.25 to 1.5: from 0.5 to 3.

2. A method according to claim 1, wherein depolymerisation is carried out under atmospheric pressure.

3. A method according to claim 1, wherein the packing of the reaction chamber is selected from the group of Raschig rings, Pall rings, Bialecki rings.

4. A method according to claim 1, wherein the polyolefin waste materials are mixed with the reactor packing at an amount not greater than 1 kg of the material per 1 $m^2$ of the specific surface area of the packing.

5. A method according to claim 1, wherein the mixture of the reactor packing and the plasticised material is fed into the reaction chamber at a temperature of 240 to 260° C., optionally, 250° C.

6. A method according to claim 1, wherein depolymerisation is carried out maintaining a temperature gradient, wherein the lower half of the tower reactor's chamber is heated using a heating system until a temperature of 400 to 440° C. is reached, while the temperature near the outlet for depolymerisation products is maintained in the range of 200 to 360° C.

7. A method according to claim 1, wherein depolymerisation is used for polyolefin materials selected from the group consisting of polyethylene, polypropylene, and polystyrene.

8. A method according to claim 1, wherein depolymerisation products are delivered to the process of hydrogenation and isomerisation in a gaseous state having a temperature in the range of 320 to 360° C.

9. A method according to claim 1, wherein hydrogenation is carried out in the presence of at least one metallic catalyst selected from the group consisting of platinum and palladium deposited on an oxide carrier selected from the group of $Al_2O_3$ and $P_2O_5$.

10. A method according to claim 1, wherein hydrogenation and isomerisation are carried out in an atmosphere of synthesis gas comprising carbon monoxide and hydrogen, with the weight ratio $CO:H_2$ being from 0.25 to 1.5: from 0.5 to 3.

11. A method according to claim 1, wherein the hydrogenation and isomerisation products are subjected to fractional distillation with separation into a low-boiling fraction (C1-C4), a benzine fraction, and an oil fraction.

12. A method according to claim 11, wherein the low-boiling fraction is used to produce synthesis gas for deploymerisation and hydrogenation.

* * * * *